United States Patent [19]

Ogland et al.

[11] 4,439,016
[45] Mar. 27, 1984

[54] OPTICAL BEAM DEFLECTION SYSTEM

[75] Inventors: Jon W. Ogland, Millersville; Joe C. Bradley, Towson; Dickron Mergerian, Baltimore, all of Md.

[73] Assignee: Westinghouse Electric Corp., Pittsburgh, Pa.

[21] Appl. No.: 319,154

[22] Filed: Nov. 6, 1981

[51] Int. Cl.³ ............................................. G02F 1/03
[52] U.S. Cl. .................................. 350/356; 350/385; 350/96.14
[58] Field of Search .................... 350/356, 385, 96.14, 350/96.13

[56] References Cited

U.S. PATENT DOCUMENTS

| 3,655,261 | 4/1972 | Chang | 350/96.13 |
| 3,874,782 | 4/1975 | Schmidt | 350/96.13 |
| 3,904,270 | 9/1975 | Cheo | 350/96.14 |
| 3,924,931 | 12/1975 | Cheo | 350/160 R |
| 4,039,249 | 8/1977 | Kaminow et al. | 350/96.13 |
| 4,185,274 | 1/1980 | Giallorenzi | 350/356 |
| 4,348,075 | 9/1982 | Gottlieb et al. | 350/96.13 |

OTHER PUBLICATIONS

Meyer; "Optical Beam Steering Using a Multichannel Lithium Tantalate Crystal"; App. Opt., vol. 11, No. 3, Mar. 1972.
Hammer; "Digital Electro-Optical Grating Deflector and Modulator"; App. Phys. Lett., vol. 18, No. 4, Feb. 15, 1971.

Primary Examiner—William L. Sikes
Assistant Examiner—Leon Scott, Jr.
Attorney, Agent, or Firm—J. B. Hinson

[57] ABSTRACT

The invention comprises a system for deflecting an optical beam in response to an electrical signal. A collimated optical beam is generated utilizing any convenient means. The collimated light beam is injected into an optical wave guide positioned between two electrodes. One electrode is substantially coextensive with the surface of the waveguide. The second electrode comprises a series of spaced stripes parallel to the optical beam and having varying length across the surface of the electro-optically sensitive material. The electro-optically sensitive material is subjected to a varying electrical field by applying an electrical voltage to the electrodes causing the velocity of propagation of the light through the electro-optically sensitive material to vary across the layer. This changes the phase relationship of the optical beam across its diameter as it emerges from the edge of the electro-optically sensitive material. This results in a deflection of the electro-optical beam. Beam positioned detection means detects the position of the optical beam as deflected and correlates the beam position with the magnitude of the deflection voltage.

4 Claims, 3 Drawing Figures

OPTICAL BEAM DEFLECTION SYSTEM

BACKGROUND OF THE INVENTION

The invention relates generally to optical systems and more specifically to optical systems for deflecting an optical beam in response to an electrical signal.

DESCRIPTION OF THE PRIOR ART

Various techniques have been utilized in the prior art to deflect optical beams in response to an electrical signal. Generally, these systems have been limited either to very small deflection angles or slow deflection rates due to the fact that they required large electrodes resulting in the input capacity to the electrical signal being rather high. These problems are substantially solved by the present invention.

SUMMARY OF THE INVENTION

The preferred embodiment of the invention comprises a method and a system for deflecting an optical beam in response to an electrical signal. A collimated optical beam is generated using any convenient method. The collimated optical beam is injected into a thin layer of electro-optically sensitive material comprising an optical wave guide such as lithium niobate, for example, which is subjected to an electric field by applying a voltage to electrodes affixed to the surface of the electro-optically sensitive material. As a result of the votage applied to the electrodes the electro-optically sensitive material is subjected to an electric field which changes the velocity of the optical beam resulting in a change in the phase of the optical beam across the beam as it emerges from the electro-optical device. This results in a shift in the direction of the optical beam. Beam position detection means determines the position of the optical beam and correlates the beam position with the magnitude of the bias voltage.

DESCRIPTION OF THE PREFERRED EMBODIMENT

Figure 1:
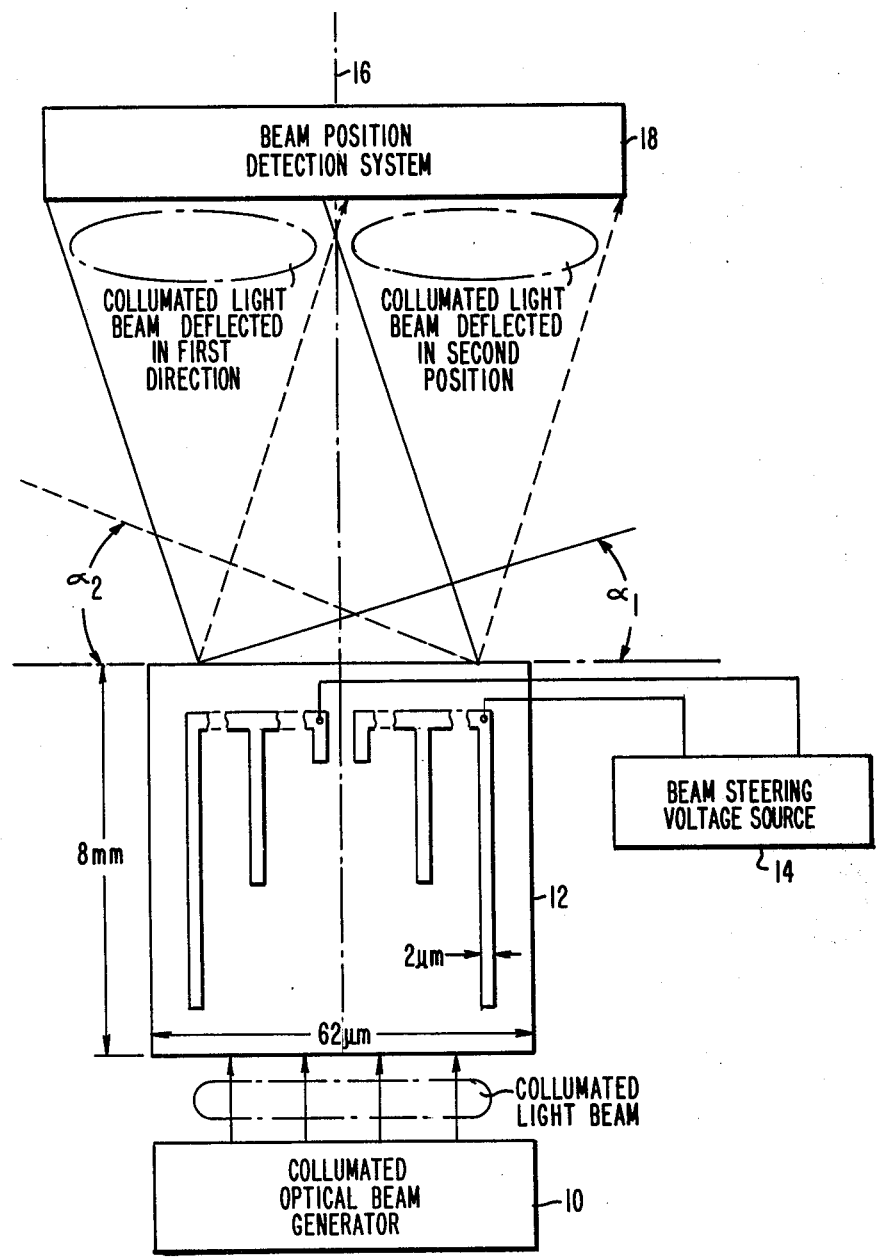
FIG. 1 is a drawing illustrating the system comprising the invention.

FIG. 1 is a drawing illustrating the preferred embodiment of the invention. A collimated light beam is generated by a collimated light beam generator 10. Structurally the collimated light beam generator 10 may be any convenient apparatus, including prior art apparatus, capable of generating a collimated light beam having the proper width and wavelength. In the preferred embodiment the width of the collimated light beam is preferably in the order of the 62 micrometers.

The collimated light beam from the optical beam generator 10 is directed to impinge upon and be injected into an optical wave guide including in the optical beam shifting apparatus 12. Any suitable technique, including prior art apparatus, may be used to inject the collimated optical beam shifting apparatus 12. A voltage signal for shifting the collimated light beam is provided by a beam steering voltage source 14. The physical dimensions and characteristics of the optical beam shifting apparatus 12 establishes a known relationship between the voltage output signal of the beam shifting voltage source 14 and the angle of shift of the collimated light beam. These relationships are subsequently described in detail.

The collimated light beam is extracted from the optical deflection apparatus 12 is shifted to either the right or left of the principal optical axis 16. Any suitable technique, including prior art techniques, may be used to extract the collimated optical beam. The direction of deflection of the optical beam is determined by the polarity of the voltage output signal of the beam steering voltage source 14 with the magnitude of the shift being determined by the amplitude of this signal. For example, with a first polarity of the voltage signal from the beam steering voltage source 12 the collimated light beam is shifted to the right of the principal optical axis 16 by an angle $\alpha_1$ while for the reverse polarity the collimated light beam is shifted to the left of the principal optical axis 16 by an angle $\alpha_2$. Assuming that the signals utilized to shift the collimated light beam to the left and right are identical with only the polarity change than $\alpha_1$ will be equal to $\alpha_2$. That is to say that the optical beam shifting apparatus 12 is substantially symmetrical with respect to sensitivity to the voltage output signal of the beam storing voltage source 14.

After extraction from the optical deflection apparatus 12 using prior art techniques, the collimated light beam impinges upon a beam position detection system 18. This system may be any suitable apparatus, including prior art apparatus, capable of detecting the position of an optical beam. An array of phototransistors or photodiodes for example. In any case, the position of the optical beam as it impinges upon the beam position detection system 18 has a known relationship to the output voltage of the beam storing source 18. This permits the system to be used in any application where it is desired to produce an optical beam which is deflected to a predetermined position in response to a voltage signal of pre-established magnitude. For example, if the voltage source input to the beam steering apparatus 12 is an analog voltage and the beam position detection system 18 is properly designed, the system functions as an analog-to-digital converter. Designing a beam detection system to function in this manner is believed to be within the capabilities of one having ordinary skill in the art.

Figure 2:
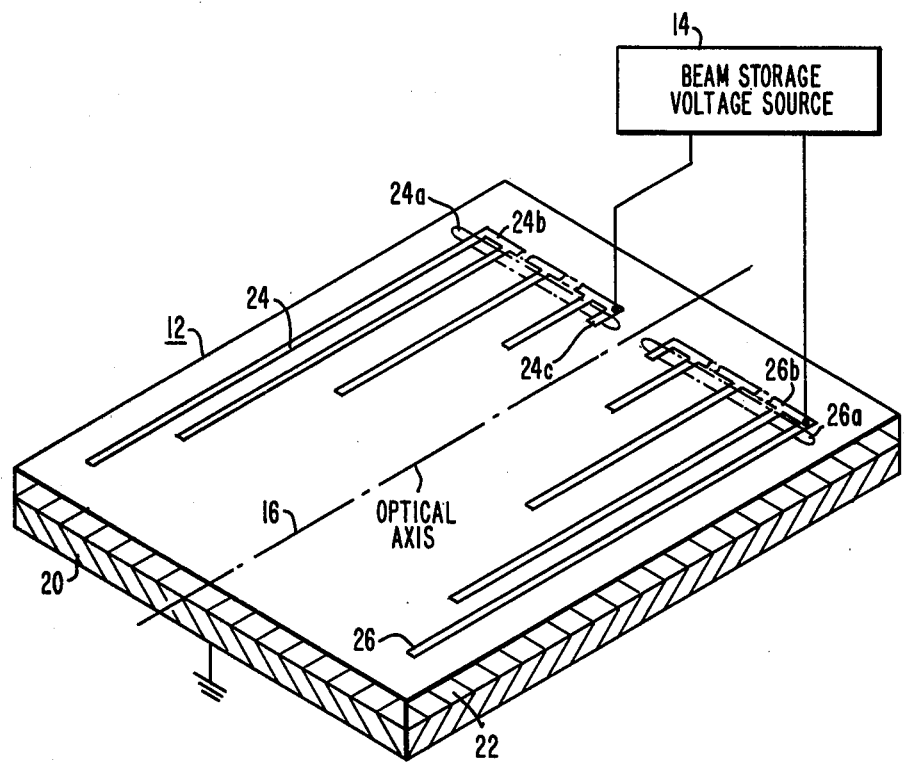
FIG. 2 is a diagram illustrating the optical beam deflection device utilized by the invention.

FIG. 2 is an isometric drawing of the optical beam shifting apparatus 12. Structurally the optical beam shifting device 12 includes a bottom electrode 20 which is electrically conductive. In the preferred embodiment the conductive electrode 20 which is substantially coextensive with the bottom surface of the optical beam shifter 12 and is preferably a thin layer of platinum. Affixed to the upper surface of the bottom electrode 20 is a thin, in the range of 0.5 to 1.0 micrometers, layer 22 of electro-optically sensitive material such as lithium niobate, for example. An optical wave guide is formed by the combination of the layer of lithium niobate 22 and the platinum electrode 20.

Positioned on the upper surface of the lithium niobate layer 22 is second and third electrodes 24 and 26 with these electrodes being mirror images of each other. That is to say, electrodes 24 and 26 are symmetrical about the principal optical axis 16 of the optical device 12. Electrode 24 includes a plurality of strip portions 24a which are parallel to the principal optical axis 16. The strip portions 24a decrease at a constant rate with the longest strip and shortest strips being respectively illustrated at reference numbers 24a and 24b, with the total number of strip portions being 32. Similarly, electrode 26 includes a plurality of strip members 26a which are also parallel to the principal optical axis 16. Strip members 24a terminate and are electrically conductive electrode member 24b which is positioned at essentially right angles to striped members 24a. The strip members 26a terminate and are electrically connected to an electrically conductive electrode 26b. Beam steering voltage source 14 is connected between the electrodes 24b and 26b with the bottom electrode 24 connected to ground potential. Beam steering voltage source 14 is preferably designed such that the output voltage is symmetrical with respect to ground. Under these conditions a voltage differential of equal magnitude but opposite direction will be established across the electro-optically sensitive layer 22 in the areas between the bottom electrode 20 and the top electrodes 24 and 26. The optical phase shifting device 12 shifts the phase of the collimated light beam because the velocity of propagation through the electro-optically sensitive layer 22 is varied as a function of the electrical field as described above.

Since this is in essence a phase array system, with each of the strips in conjunction with the bottom electrode 20 functioning as a member of the array, the collimated light beam output will not be a single beam but will comprise a principal high level beam with minor secondary beams as spaced therefrom. Typical light beam detection apparatus is responsive to all light impinging thereon. The detection system must be designed to either be insensitive to the minor beams or the useful angle of shift must be limited to prohibit these beams from impinging upon the detection apparatus.

Figure 3:
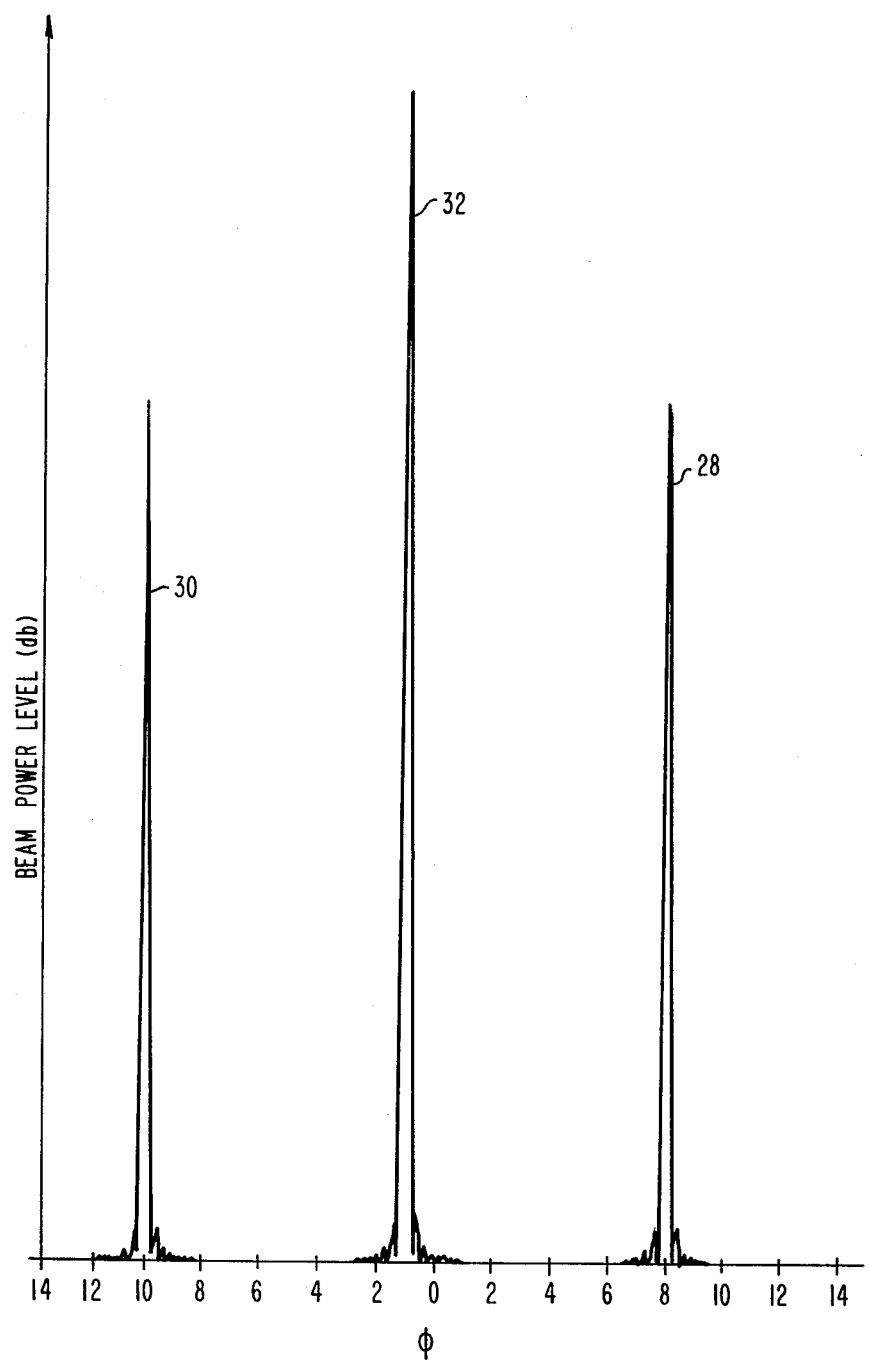
FIG. 3 is a diagram illustrating the characteristics of the shifted optical beam.

FIG. 3 illustrates the performance of the beam shifting device of FIG. 1. Plotted along the vertical axis is the power level of the collimated beam as a function of the shift angle plotted along the horizontal axis. As is conventional in such systems the minor beams 28 and 30 are substantially symmetrical with respect to the principal beam 32. The angular spacing between the principal beam 32 and either of the minor beams 28 or 30 is approximately 8° indicating that the useful shift range of the embodiment illustrated is either ±8°.

The results shown in FIG. 3 are confirmed by the following mathematical analysis.

In practice the deflection angle $\alpha$ is determined by the delay across the collimated optical beam $\Delta L$ divided by the width of the optical beam $\omega$. Since the layer of lithium niobate is to be subjected to varying electric fields $\Delta L$ will be determined by the thin field and the length of the paths. In the preferred embodiment the lithium niobate layer is in the order of 0.5 to 1.0 micrometers thick. Under these conditions the index of refraction will be $$n = n_0 \pm f(E)$$

This results in the velocity of the collimated beam being $$V = \frac{c}{n_0 \pm f(V)}$$

Using this relationship the time to propagate through the slowest path is:

$$\tau = \frac{L}{c/(n_0 + \Delta n)} = \frac{L(n_0 + \Delta n)}{c}$$

Similarly the propagation time for the fastest path is $$\tau = \frac{L}{c/(n_0 - \Delta n)} = \frac{L(n_0 - \Delta n)}{c}$$

This results in the deflection angle $$\alpha \sim \frac{\Delta}{W/2} = \frac{2L\Delta n}{n_0 W}$$

From FIG. 1 it can be seen that a symmetrical pattern yields twice the deflection angle as a single triangular pattern. Since the device operates on a phased array approval, side lobe will be generated. The angle between the major beam and the first side lobe is:

$$b.s. = g/W = \lambda_0/nW$$

Hence, the maximum number of resolution elements within the deflection angle is:

$$N' = \frac{2\alpha}{b.s.} = \frac{4L\Delta n \cdot nW}{nW\lambda_0} = \frac{4L\Delta n}{\lambda_0}$$

Similarly (F) the number of strips in a pattern is:

$$F = N/2$$

For the device illustrated:

$$N = \frac{(4)(8)(0.001)}{1} = 32$$

$$\alpha = \frac{(2)(8)(0.001)}{(2)(2)(62)} = 6.7°$$

$$c = \frac{(\epsilon)(\epsilon_0) A}{d} = 63.5 \text{ pF}$$

This results in a total beam deflection of a magnitude suitable for analog to digital converter applications. An input capacitance of 63 pF permits the optical beam shifter to be operated at a high rate.

We claim:

1. An optical beam deflector comprising:
   (a) a first electrically conductive electrode;
   (b) a layer of electro-optical material affixed to said first electrically conductive electrode;
   (c) a second electrode comprising a pattern of stripes of electrically conductive material affixed to a second surface of said layer of electro-optical material, said strips being longer near opposed edges of said electro-optical layer and shorter near the center of said pattern of stripes.

2. A system for selectively deflecting an optical beam in response to an electrical signal; comprising in combination:
   (a) an optical source for generating a collimated optical beam;
   (b) an optical beam deflecting device positioned in said optical beam for deflecting said optical beam in response to a changing electric field across selected portions of a layer of electro-optically sensitive material, with the length of said selected portions incrementally changing;
(c) optical detection means for detecting the position of said optical beam after transmission through said optical beam deflecting device.

3. A system in accordance with claim 2 wherein said optical beam deflecting device comprises:
(a) a thin layer of electro-optical sensitive material;
(b) a first electrically conductive electrode affixed to a first surface of said layer of electro-optically sensitive material and substantially coextensive therewith;
(c) second and third electrodes affixed to a second surface of said layer of electro-optically sensitive material, each of said second and third electrodes including a plurality of striped portions, said striped portions being positioned substantially parallel to said optical beam.

4. A system in accordance with claim 3 wherein each of said second and third electrodes includes eight striped portions.

* * * * *